United States Patent [19]

Togawa

[11] Patent Number: 4,608,500
[45] Date of Patent: Aug. 26, 1986

[54] ELECTRIC POWER UNIT

[75] Inventor: Jiro Togawa, Tokyo, Japan

[73] Assignee: Nippon Chemi-Con Corporation, Tokyo, Japan

[21] Appl. No.: 630,052

[22] Filed: Jul. 12, 1984

[30] Foreign Application Priority Data

Jul. 27, 1983 [JP] Japan ............................ 58-117618[U]

[51] Int. Cl.$^4$ ............................................ H02M 7/19
[52] U.S. Cl. ...................................... 307/72; 307/150;
307/140; 363/61; 323/300
[58] Field of Search ........................ 307/52, 60, 64, 66,
307/72, 75, 112, 116, 125, 126, 130, 140;
323/299, 300; 363/59, 61, 143

[56] References Cited

U.S. PATENT DOCUMENTS

| 3,524,072 | 8/1970 | Tsergoo | 307/112 |
| 3,900,787 | 8/1975 | Köster | 363/143 X |
| 4,167,777 | 9/1979 | Allington | 363/61 |
| 4,268,899 | 5/1981 | Rokas | 363/61 |

FOREIGN PATENT DOCUMENTS 162881 12/1980 Japan .................................. 363/143

Primary Examiner—A. D. Pellinen
Assistant Examiner—Derek S. Jennings
Attorney, Agent, or Firm—Sughrue, Mion, Zinn, Macpeak, and Seas

[57] ABSTRACT

An electric power unit capable of operating from different AC input power source voltages in which changes in the AC input voltage are compensated for automatically and rapidly. The power unit includes a rectifier circuit having both a voltage-multiplying rectification function and a non-voltage-multiplying rectification function. A switching circuit is provided for selecting as the operating rectification function one of the voltage-multiplying rectification function and the non-voltage-multiplying rectification function. A switching control circuit, operating with the AC input to the rectifier circuit as a reference potential, controls the switching circuit according to the value of the AC input voltage. An auxiliary power source establishes a voltage for powering the switching control circuit before the operation of the switching control circuit to select the rectification function is effected.

6 Claims, 1 Drawing Figure

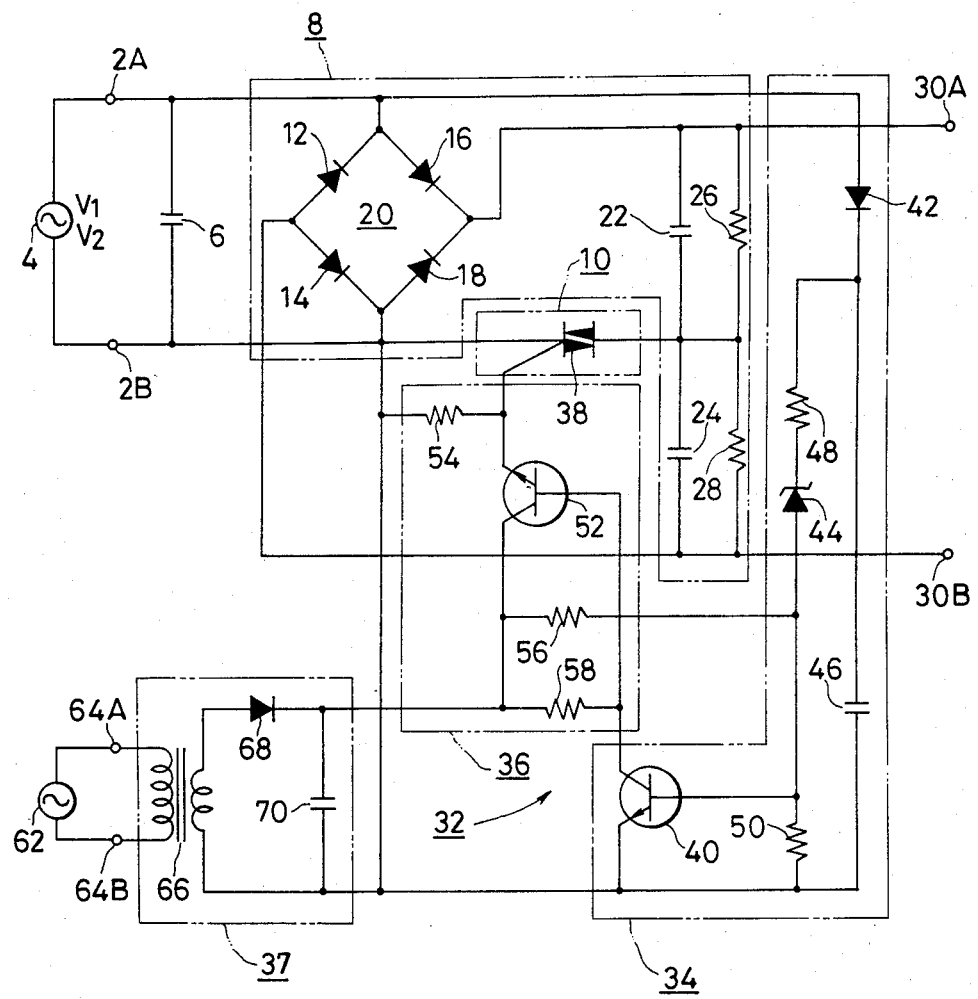

ELECTRIC POWER UNIT

BACKGROUND OF THE INVENTION

The present invention relates to electric power units, and more particularly to an electric power unit in which, when the AC input voltage is changed from one value to another, switching is automatically effected between a voltage-multiplying rectification function and a nonvoltage-multiplying rectification function.

Some electronic devices are designed so as to operate on various different AC input voltages, such as 100 V and 220 V. In such an electronic device, in the event that the AC input voltage to the electric power unit is switched over to another value. the DC output must be maintained unchanged. In order to meet this requirement, a method may be employed in which, in the power unit, a DC output is produced using ordinary rectification when a high AC input voltage is present, and, in the case of a low input voltage, the DC output voltage is increased by voltage-multiplying rectification. In the case where the electric power unit has two different rectification functions as described above, provision for switching between the two functions is essential. For this purpose, mechanical switching may be employed. However, in this case, it is considerably troublesome to effect the switching operation, which must be carried out manually. If the switching operation is not performed properly, for instance, if voltage-multiplying rectification is employed in the presence of a high AC input voltage, an overly high DC output will be produced, damaging the electronic device powered by the power unit.

Electronic control can be employed for switching the rectification functions, in which case the switching operation can be automatically achieved by detecting the input voltage. However, the speed at which such control can be carried out is greatly affected by the speed at which a voltage for driving the switching control device can be established. That is, if the voltage for powering the switching control device is established with a delay, the reliability in switching the rectification functions may be low.

Accordingly, an object of the invention is to provide an electric power unit in which, in response to the switching of an input voltage to another value, the aforementioned rectification functions are automatically switched quickly and with high reliability.

SUMMARY OF THE INVENTION

The foregoing and other objects of the invention have been achieved by the provision of an electric power unit which, according to the invention, comprises a rectifier circuit having a voltage-multiplying rectification function and a non-voltage-multiplying rectification function; a switching circuit for selecting as an operating rectification function one of the voltage-multiplying rectification function and the non-voltage-multiplying rectification function of the rectifier circuit; a switching control circuit, employing an AC input voltage of the rectifier circuit as a reference potential, for controlling the switching circuit according to the AC input voltage; and an auxiliary power source circuit for establishing a voltage for powering the switching control circuit before the selection operation of the switching circuit is carried out.

BRIEF DESCRIPTION OF THE DRAWING

The single FIGURE in the accompanying drawing is a block diagram showing an example of an electric power unit constructed according to the invention.

DESCRIPTION OF THE PREFERRED EMBODIMENTS

The present invention will be described in detail with reference to a preferred embodiment shown in the accompanying drawing.

The single FIGURE in the accompanying drawing shows an example of an electric power unit according to the invention. The electric power unit has input terminals 2A and 3B connected to an AC power source 4. The input voltage can be either a low voltage $V_1$ or a high voltage $V_2$ ($=2\ V_1$). The input terminals 2A and 2B are connected to respective power line conductors, which are shunted by a capacitor 6 and by a rectifier circuit 8, the latter having both a voltage-multiplying rectification function and a non-voltage-multiplying rectification function. The circuit 8 is connected to a switching circuit 10 for selecting which of the two functions is to be employed. The circuit 8 includes a bridge rectifier circuit 20 composed of diodes 12, 14, 16 and 18, and has output terminals 30A and 30B at which the rectified output is provided. First terminals of capacitors 22 and 24 and resistors 26 and 28 are connected to the output terminals 30A and 30B as shown in the figure, and the remaining terminals thereof are connected together. The aforementioned switching circuit 10 is connected between the junction point of the capacitors 22 and 24 and the resistors 26 and 28 and the junction point of the cathode of the diode 14 and the anode of the diode 18.

The switching circuit 10 is controlled by a switching control circuit 32. The switching control circuit 32 includes a voltage switching detecting circuit 34 for detecting which of the two input voltages ₁ and $V_2$ is present, and a switching drive circuit 36 for driving the switching circuit 10 in response to the detection output of the detecting circuit 34. A drive input is applied to the switching drive circuit 36 by an auxiliary power source circuit 37. In the switching control circuit 32, the voltage detection reference point of the voltage switching detecting circuit 34 is obtained from the power line on the AC input side, the potential of which is the same for both values of input voltage and both functions of the rectifier circuit 8.

In the described embodiment, the switching circuit 10 employs a bidirectional controlled rectifying element, namely, a triode AC switch (triac) 38. The voltage switching detecting circuit 34 is composed of a transistor 40, a diode 42, a Zener diode 44, a capacitor 46, and resistors 48 and 50. More specifically, the anode of the diode 42, used to rectify the AC input, is connected to the power line conductor connected to the input terminal 2A. The smoothing capacitor 46 and the series circuit of the resistor 48, the Zener diode 44 and the resistor 50 are connected between the cathode of the diode 42 and the power line conductor connected to the input terminal 2B. The collector of the transistor 40 is connected to the switching drive circuit 36.

The switching drive circuit 36 includes a transistor 52 and resistors 54, 56 and 58. The base of the transistor 52 is connected to the collector of the transistor 40. The collector of the transistor 52 receives a DC input from the auxiliary power source circuit 37, and the emitter is connected to the gate of the triode AC switch 38, which is connected through the resistor 54 to the input terminal 2B. The collector of the transistor 52 is connected through the resistor 56 to the anode of the Zener diode 44, and through the resistor 58 to the collector of the transistor 40.

The auxiliary power source circuit 37 has input terminals 64A and 64B, which are connected to an AC power source 62. The AC power source 62 may be the same as or different from the first-mentioned AC power source 4. That is, in the circuit 37, the input voltage is reduced by a transformer 66, and the AC output of the latter is rectified by a diode 68 and smoothed by a capacitor 70 to provide a DC output. The DC output is applied to the switching drive circuit 36.

The operation of the electric power unit thus constructed will now be described.

When the voltage $V_2$ is applied across the input terminals 2A and 2B, the transistor 40 in the voltage switching detecting circuit 34 is rendered conductive because its base is held at a high potential, while the transistor 52 in the switching drive circuit 36 is rendered nonconductive. As a result, the triode AC switch 38 is rendered nonconductive, and a non-voltage-multiplying rectification output voltage $V_{20}$ is provided between the output terminals 30A and 30B.

In the case where the input voltage is at the lower value $V_1$, the transistor 40 in the voltage switching detecting circuit 34 is rendered nonconductive, and therefore the transistor 52 is rendered conductive. Accordingly, a trigger current from the auxiliary power source circuit 37 is applied through the collector and emitter of the transistor 52 to the gate of the triode AC switch 38 to render the latter conductive. Since the rectifier circuit 8 is a voltage doubler rectifier circuit, the voltage $V_1$ is rectified and doubled so that a voltage $2 V_{10} (= V_{20})$ is provided between the output terminals 30A and 30B.

In the electric power unit thus constructed, in response to the actual AC input voltage applied to the input terminals 2A and 2B, the necessary one of the voltage-multiplying rectification function and the non-voltage-multiplying rectification function is automatically selected and activated. Thus, the desired rectified output can be obtained quickly and without any danger of damage to the circuitry being powered by the electric power unit.

In the described embodiment, the gate current applied through the switching drive circuit to the triode AC switch 38 is provided by the auxiliary power source circuit 37, and therefore the voltage is set up quickly, thus improving the control characteristic of the circuit. In addition, the consumption of power from the main power source system applied between the input terminals 2A and 2B is reduced, and the efficiency of transformation of the main power source system increased.

While a preferred embodiment has been described with reference to a voltage doubler circuit in which the input voltage is doubled to obtain the rectified output, the invention is not limited thereto or thereby. That is, the invention can be implemented with a rectifier circuit in which the input voltage is multiplied N times to obtain the rectified output. Also, the invention can provide an electric power unit to which more than two different voltages are selectively applied.

As described above, according to the invention, automatic selection is made between the voltage-multiplying rectification function and the non-voltage-multiplying rectification function, and the power voltage for the control system which carries out the selection is fully established before the rectification function is established, thereby permitting switching control with high reliability.

I claim:

1. An electric power unit, comprising:
   a rectifier circuit receiving AC power from an AC power source on at least first and second input terminals, providing rectified power on at least one output terminal, and having a voltage-multiplying rectification function and a non-voltage-multiplying rectification function, said rectifier circuit comprising a voltage-multiplying circuit and switch means for selectively rendering operative said voltage-multiplying circuit;
   a switching circuit coupled to said rectifier circuit for selecting as an operating rectification function one of said voltage-multiplying rectification function and said non-voltage-multiplying rectification function of said rectifier circuit;
   switching control circuit means for controlling said switching circuit according to a reference potential of an AC input voltage derived from said AC power or said rectifier circuit, said switching control circuit control means comprising a diode having a first terminal coupled to said first input terminal, a capacitor having a first terminal coupled to a second terminal of said diode and a second terminal connected to said second input terminal, a Zener diode having a first terminal coupled to said second terminal of said diode, and an amplifying transistor having a base coupled to a second terminal of said Zener diode and an output electrode coupled to an input of said switching circuit; and
   an auxiliary power source circuit for establishing a voltage for powering said switching control circuit.

2. The electric power unit of claim 1, wherein said switching circuit comprises a second transistor having a base coupled to a collector of said firstmentioned transistor and an emitter coupled to a control input of said switch means.

3. The electric power unit of claim 2, wherein said auxiliary power source is coupled to receive AC input power from an AC input source different than an AC input source supplying said AC input voltage to said rectifier circuit.

4. The electric power unit of claim 3, wherein said switch means comprises a triode AC switch.

5. An electric power unit comprising:
   a bridge rectifier circuit having first and second input terminals coupled to a first AC source, output terminals of said bridge rectifier circuit being coupled to corresponding first and second output terminals;
   a first capacitor having a first terminal coupled to said first output terminal;
   a second capacitor having a first terminal coupled to a second terminal of said first capacitor and a second terminal coupled to said second output terminal;
   a first resistor having a first terminal coupled to said first output terminal;
   a second resistor having a first terminal coupled to a second terminal of said first resistor and a second terminal of said first capacitor and a second terminal coupled to said second output terminal;

a triode AC switch having a first main terminal coupled to said second input terminal and a second main terminal coupled to said second terminal of said first capacitor;

a first transistor having an emitter coupled to a control terminal of said triode AC switch;

a third resistor having a first terminal coupled to said second input terminal and a second terminal coupled to said emitter of said first transistor;

a fourth resistor coupled between a base and a collector of said first transistor;

a second transistor having a collector coupled to said base of said first transistor;

a fifth resistor coupled between said collector of said first transistor and a base of said second transistor;

a sixth resistor coupled between a base and an emitter of said second transistor;

a Zener diode having an anode coupled to said base of said second transistor;

a seventh resistor having a first terminal coupled to a cathode of said Zener diode;

a diode having an anode coupled to said first input terminal and a cathode coupled to a second terminal of said seventh resistor;

a third capacitor coupled between said cathode of said diode and said emitter of said second transistor; and a DC power supply for providing a DC voltage between said collector of said first transistor and said emitter of said second transistor.

6. The electric power unit of claim 5, wherein said DC power supply comprises a transformer having a primary coupled to a second AC source different from said first AC source coupled to said first and second input terminals; a second diode having an anode coupled to a first terminal of a secondary of said transformer and a cathode coupled to said collector of said first transistor; and a fourth capacitor having a first terminal coupled to said cathode of said second diode and a second terminal coupled to a second terminal of said secondary and said second input terminal.

* * * * *